United States Patent [19]

Wagner et al.

[11] Patent Number: 4,828,337

[45] Date of Patent: May 9, 1989

[54] BRAKE SYSTEM FOR AUTOMOTIVE VEHICLES

[75] Inventors: Wilfried Wagner, Huettenberg-Weidenhausen; Lothar Schiel, Eppstein, both of Fed. Rep. of Germany

[73] Assignee: Alfred Teves GmbH, Frankfurt am Main, Fed. Rep. of Germany

[21] Appl. No.: 127,337

[22] Filed: Dec. 1, 1987

[30] Foreign Application Priority Data

Dec. 2, 1986 [DE] Fed. Rep. of Germany ....... 3641105

[51] Int. Cl.⁴ .......................... B60T 8/44; B60T 13/52
[52] U.S. Cl. ...................................... 303/114; 60/581; 188/356; 303/4; 303/12
[58] Field of Search .................. 303/114, 4, 2, 115; 60/561, 581; 188/356

[56] References Cited

U.S. PATENT DOCUMENTS

| | | | |
|---|---|---|---|
| 3,559,532 | 2/1971 | MacDuff et al. | 303/114 |
| 3,608,982 | 9/1971 | Inada et al. | 303/114 |
| 4,096,696 | 6/1978 | Van House | 60/581 |
| 4,330,996 | 5/1982 | Becht et al. | 60/581 |
| 4,576,004 | 3/1986 | Bach | 188/356 |

FOREIGN PATENT DOCUMENTS 2162605 2/1986 United Kingdom ................ 303/114

*Primary Examiner*—Andres Kashnikow
*Assistant Examiner*—Matthew C. Graham
*Attorney, Agent, or Firm*—James B. Raden

[57] ABSTRACT

A brake system for automotive vehicles is disclosed comprising a vacuum brake force booster operatively located between a brake pedal and a master brake cylinder. The vacuum brake force booster includes at least two working chambers separated from one another by a membrane plate, one of the working chambers, through a master magnetic valve, being in communication with a vacuum source and the other working chamber being vented through a control valve acutable by the brake pedal to generate a brake force proportional to the brake pedal force. Connected to the master brake cylinder are brake circuits applying pressure to the wheel brake cylinders. Sensors associated with the wheels detect the rotational behavior of the wheels to identify a locking condition. Output signals are applied to a central electronic regulator supplying, in response to the signals, at least one switch-over signal to the master magnetic valve so that the working chamber in communication with the vacuum source may be connected to atmosphere rather than to the vacuum source. Provided in the vacuum brake force booster is an auxiliary membrane plate fixed to a guide sleeve, separating an additional working chamber in permanent communication with the vacuum source from the vented working chamber. Supported on the guide sleeve, through a spring package, is a piston rod receiving the brake pedal force, while the membrane plate, for generating the brake force, is disposed in a manner displaceable away from the guide sleeve.

14 Claims, 5 Drawing Sheets

BRAKE SYSTEM FOR AUTOMOTIVE VEHICLES

BACKGROUND OF THE INVENTION

The present invention relates to a brake system for automotive vehicles of the type comprising a vacuum brake force booster operatively located between a brake pedal and a master brake cylinder which includes at least two working chambers separated from one another by a membrane plate, with one of the working chambers, through a master magnetic valve, being in communication with a vacuum source, and the other of the working chambers, through a control valve actuable by the brake pedal, being ventable to generate a brake force in proportion to the brake pedal force. Such a system further includes brake circuits in communication with the master brake cylinder for applying pressure to wheel brake cylinders. Sensors associated with the wheels detect the rotational behavior of the wheels to identify a locking condition, with the output signals thereof being applied to a central electronic regulator supplying, in response to the input signals, at least one switch-over signal to the master magnetic valve such that the working chamber connected to the vacuum source can be placed in communication with the atmosphere rather than with the vacuum source.

A brake system for automotive vehicles of the aforedescribed type is disclosed in the published German application DE-OS No. 33 17 629 or its corresponding U.S. Pat. No. 4,702,531 wherein a vacuum brake force booster is provided to transfer the brake pedal force generated by the brake pedal, through a piston-and-push rod, to a tandem master brake cylinder. The vacuum brake force booster comprises a vacuum working chamber separated, by a membrane plate, from a ventable working chamber, with the membrane plate being fixed to the piston-and-push rod. The tandem master brake cylinder, through two brake circuits, is in communication with corresponding wheel brake cylinders of the brakes.

During normal deceleration, first, the brake pedal force, through the piston-and-push rod, is transferred to the tandem master brake cylinder. At the same time, the rear working chamber of the vacuum brake force booster is vented by means of a control valve, while the front working chamber continues to be connected to the vacuum source such that different pressures prevail on the two sides of the membrane plate. The pressure difference on the membrane plate, accordingly, causes an auxiliary force to be transferred along with the brake pedal force as a brake force to the master brake cylinder.

When a brake skid control is required during deceleration because of the locking condition of one of the decelerated wheels as detected by a device for monitoring the rotating pattern of the wheels, the brake force acting upon the master brake cylinder will have to be reduced. For that purpose, the vacuum working chamber is vented while the rear pressure working chamber is connected to the vacuum source and, accordingly, is evacuated. The pressure difference acting upon the membrane plate, first, is reduced until the auxiliary force is eliminated. In the event that a further reduction in the brake pressure is required, a pressure difference directed opposite to the pressure prevailing in the normal operational sense is developed on the membrane plate causing, through the membrane plate, a compensation firce to be applied opposite the brake pedal force such that the master brake cylinder can be further relieved. When brake skid control is no longer required, the normal connections of the vacuum brake force booster are re-established thereby enabling the braking operation to be performed in usual manner.

Although in this prior known brake system for automotive vehicles, brake skid control is performed very rapidly, it is imperative in the interest of an increasing safety of automotive vehicles to enable the brake pressure as generated by the master brake cylinder to be decreased even more rapidly than such prior art systems.

SUMMARY OF THE INVENTION

It is, therefore, an object of the present invention to provide a vacuum brake force booster of simplified construction wherein the brake force transferred by the vacuum brake force booster to the master brake cylinder can be quickly decreased and reincreased as required.

This object, is achieved by the invention in that an auxiliary membrane plate secured to a guide sleeve is provided in the vacuum brake force booster to separate an additional working chamber which is in permanent communication with the vacuum source from the vented working chamber. A piston rod which receives the brake pedal force, through a spring package, is supported on the guide sleeve, and a membrane plate for generating the brake force is disposed in a manner freely displaceable away from the guide sleeve.

Because the guide sleeve is normally held in its rest position by a force proportional to the brake force, on which the piston rod, through the spring package, is supported, the membrane plate may be disposed in a manner freely displaceable such that only the force generated by the pressure difference on the membrane plate is used as the brake force. Advantageously, according to the invention, a mechanical separation of the brake pedal force from the brake force is provided for, whereby, during a brake skid control, the brake force will be reduced to zero at the moment when the pressure difference disappears from the membrane plate. Since there is no need for a compensation force counteracting the brake pedal force to be developed, the brake skid control can be performed even more rapidly than in conventional brake systems for automotive vehicles.

The brake system for automotive vehicles according to the invention also permits further mechanical simplification since it is only necessary to vent the vacuum working chamber to achieve adequate decrease of the pressure difference on the plate. Hence, only a 3-way/2-position valve is required as a master magnetic valve so as to connect the vacuum working chamber to the atmosphere rather than to the vacuum source. Because the invention provides for a quick vacuum/atmosphere switch-over of the master magnetic valve of simple construction, modulation of the brake force generated by the pressure difference on the membrane plate may be achieved in simple and precise manner.

A further advantage of the system is that braking readiness is also insured in case of a failure of the vacuum source, since the force holding the guide sleeve is generated in the same manner as the brake force. In case of a failure of the brake force generated by the vacuum, the force holding the guide sleeve will be eliminated such that the guide sleeve is displaceable by the piston rod against the membrane plate thereby directly applying pressure to the membrane plate. The brake pedal force, hence, in case of a failure, is mechanically guided through the vacuum brake force booster and is utilized as brake force applying pressure to the master brake cylinder.

According to one embodiment of the invention, the guide sleeve has a front face thereof facing away from the membrane plate, which may be forced against a rear housing portion of the vacuum brake force booster, thereby firmly holding, in particularly simple manner, the guide sleeve in its rest position on the housing of the vacuum brake force booster.

To provide improved receptance of forces acting in a direction transverse of the brake pedal force, the guide sleeve is passed, in sliding and vacuum-tight manner, through a guide nozzle located on the rear housing portion of the vacuum brake force booster. The auxiliary membrane plate, with a stop ring, is forceable against the rear housing portion, with the stop ring being provided on the outer periphery of the auxiliary membrane plate.

According to another embodiment of the invention, the stop ring provided on the auxiliary membrane plate is connected to the guide sleeve and is forceable against a sealing ring located between guide sleeve and guide nozzle.

According to a further embodiment of the invention, the guide sleeve, with the anterior front face thereof, forms a stop for the membrane plate, thereby fixing, in a structurally simple manner, a defined rest position for the membrane plate.

A still further important embodiment of the invention provides for the membrane plate to be held on a membrane plate retaining cup against the stop on the guide sleeve. The retaining cup is formed integrally with a push rod and transfers the brake force to the master brake cylinder thereby enabling the membrane plate to be manufactured independently of the retaining cup involving particularly easy manufacture of the required units. Forming the retaining cup integrally with the push rod enables a particularly compact and stable unit transferring the brake force from the vacuum brake force booster to the master brake cylinder.

According to an advantageous feature of the invention, a control unit including the control valve, is slidingly located in the guide sleeve, with pressure being applied to the control unit by the piston rod. The control unit, through the spring package, is supported against a support ring provided on the guide sleeve in the area of the front end thereof, thereby insuring that the brake pedal force be directly used for regulating the pressure difference prevailing on the membrane plate. The spring package forms a resistance counteracting the brake pedal force.

In order to attain, through the piston rod, a return signal (or feed) to the brake pedal corresponding to the brake force, the spring package includes a specific force characteristic. Hence, during application of the brake pedal, resistance is generated in proportion to the brake force acting on the master brake cylinder.

To restore the piston rod applying pressure to the control unit after each braking process to the initial position thereof, according to the invention, the spring pachage forces the control unit against a rear stop shoulder formed on the guide nozzle of the rear housing portion.

According to another feature of the invention, the stop shoulder is formed on the guide nozzle thereby fixing, in the event that the guide sleeve is guided through the guide nozzle on the housing of the vacuum brake force booster the rest position of the control unit and, hence, of the piston rod.

According to another feature of the invention, the stop shoulder is formed on the guide sleeve.

According to still another feature of the invention the control unit, with a front control housing portion, is guided, in piston-type manner, within the guide sleeve, thereby subdividing the inner chamber of the guide sleeve into front and rear inner chambers, with the rear inner chamber being in communication with the ventable working chamber of the vaccum brake force booster and the front inner chamber being in communication with the vacuum source, thereby generating, through the pressure difference between the front and rear chambers of the guide sleeve, an additional force influencing the control capability of the control valve, thereby enabling adjustment of any desired relationship between brake pedal force and brake force.

According to yet another feature of the invention, the front inner chamber of the guide sleeve is in communication with the vacuum source through the first working chamber which is separated from the ventable working chamber by the membrane plate thereby causing a change in the additional force acting upon the control unit in the event of a brake skid control and, hence, causes a change in the resistance acting against the brake pedal force. Occurrence of a brake skid control is indicated by a return signal supplied to the brake pedal through the piston rod.

According to still another embodiment of the invention, the front inner chamber of the guide sleeve is in communication with the vacuum source through a second working chamber which is separated from the ventable working chamber by the auxiliary membrane plate. In this respect, the resistance provided by the spring package and by the additional force against the brake pedal force always corresponds to the brake force generated during the normal braking process, even in the event that a brake force regulation is performed by venting the vacuum working chamber. The pressure in the vented working chamber, also in a brake skid control, thus only depends on the brake pedal force acting through the piston rod and, also during a brake skid control, can be further increased independently of the brake pedal force.

BRIEF DESCRIPTION OF THE DRAWING

The invention will now be described with reference to the drawing, wherein.

In the various figures, corresponding units have been designated by identical reference numerals.

DETAILED DESCRIPTION OF A PREFERRED EMBODIMENT

Figure 1:
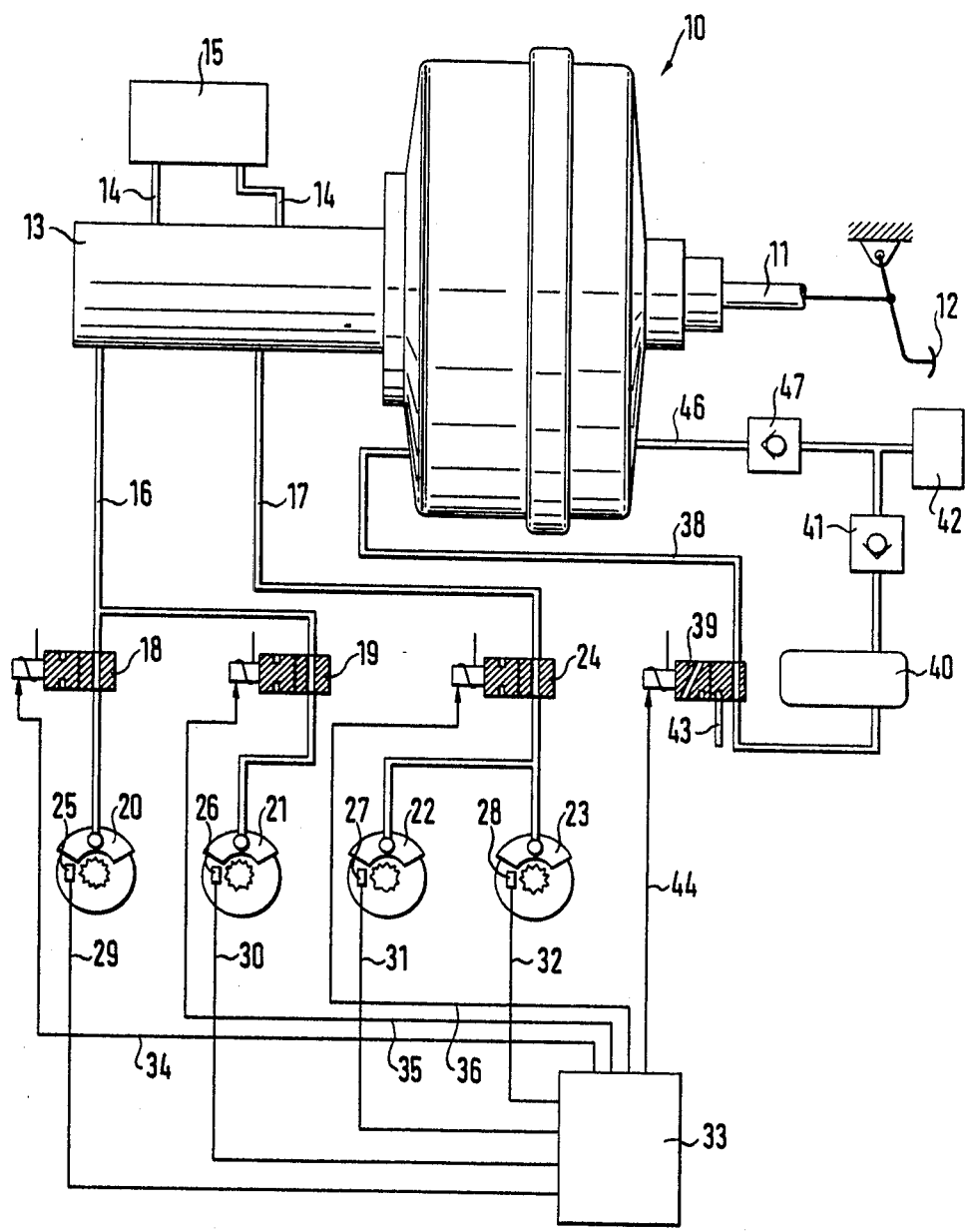
FIG. 1 schematically shows details of a brake system according to the invention for automotive vehicles, FIG. 1a schematically shows details of a simplified brake system according to the invention for automotive vehicles.

FIG. 1 shows a brake system for automotive vehicles, including a vacuum brake force booster 10 which, through a piston rod 11, in known manner, is in communication with a brake pedal 12. Located on the side of the vacuum brake force booster 10 facing away from piston rod 11, is a tandem master brake cylinder 13 which, through supply conduits 14, is in communication with a brake fluid reservoir 15. Connected to the tandem master brake cylinder 13 are first and second brake circuits 16 and 17, respectively.

The first brake circuit 16, through two 2-way/2-position magnetic valves 18, 19 connects the wheel brake cylinders of the right and lefthand front wheel brakes 20 and 21, respectively (depicted only schematically) to the tandem master brake cylinder 13. Each of the two magnetic valves 18, 19 is associated to one of the two front wheel brakes 20 and 21, respectively. The second brake circuit 17 connects the wheel brake cylinders of the rear wheel brakes 22, 23, also shown schematically, through a common 2-way/2-position magnetic valve 24 to the master cylinder 13.

Associated with each front and rear wheel brakes 20, 21, 22 and 23 is one sensor 25, 26, 27 and 28, respectively, which, through corresponding signal conduits 29, 30, 31 and 32, respectively, are in communication with a central electronic regulator 33. The sensors 25, 26, 27 and 28 may be, for example, in the form of inductive transducers, monitor the wheel rotational behavior and supply corresponding signals through the signal conduits 29, 30, 31 and 32, respectively, to the electronic regulator 33. The electronic regulator 33, through control conduits 34, 35, 36, is in communication with the magnetic valves 18, 19 and 24, respectively, to actuate the valves in response to the sensor signals.

A first working chamber 37 (FIGS. 2 and 3) of the vacuum brake force booster 10 is in communication with a vacuum source 42 through a vacuum conduit 38, a master magnetic valve 39, a vacuum accumulator 40 and a check valve 41. The master magnetic valve 39 of 3-way/2-position valve configuration, in its first position, the valve is in a de-energized condition and connects the vacuum conduit 38 to the vacuum accumulator 40 and the vacuum source 42, respectively. In its second position, the master magnetic valve 39 is in an energized condition and blocks the passage to the vacuum source 42 and, at the same time, connects the vacuum conduit 38 to an outdoor air connector 43. To actuate the master magnetic valve 39 by means of the central electronic regulator 33, a control conduit 44 is provided leading from the electronic regulator 33 to the master magnetic valve 39.

A second working chamber 45 (FIGS. 2 and 3) of the vacuum brake force booster 10 is in direct communication with the vacuum source 42 through a vacuum conduit 46 and a check valve 47.

Figure 1A:
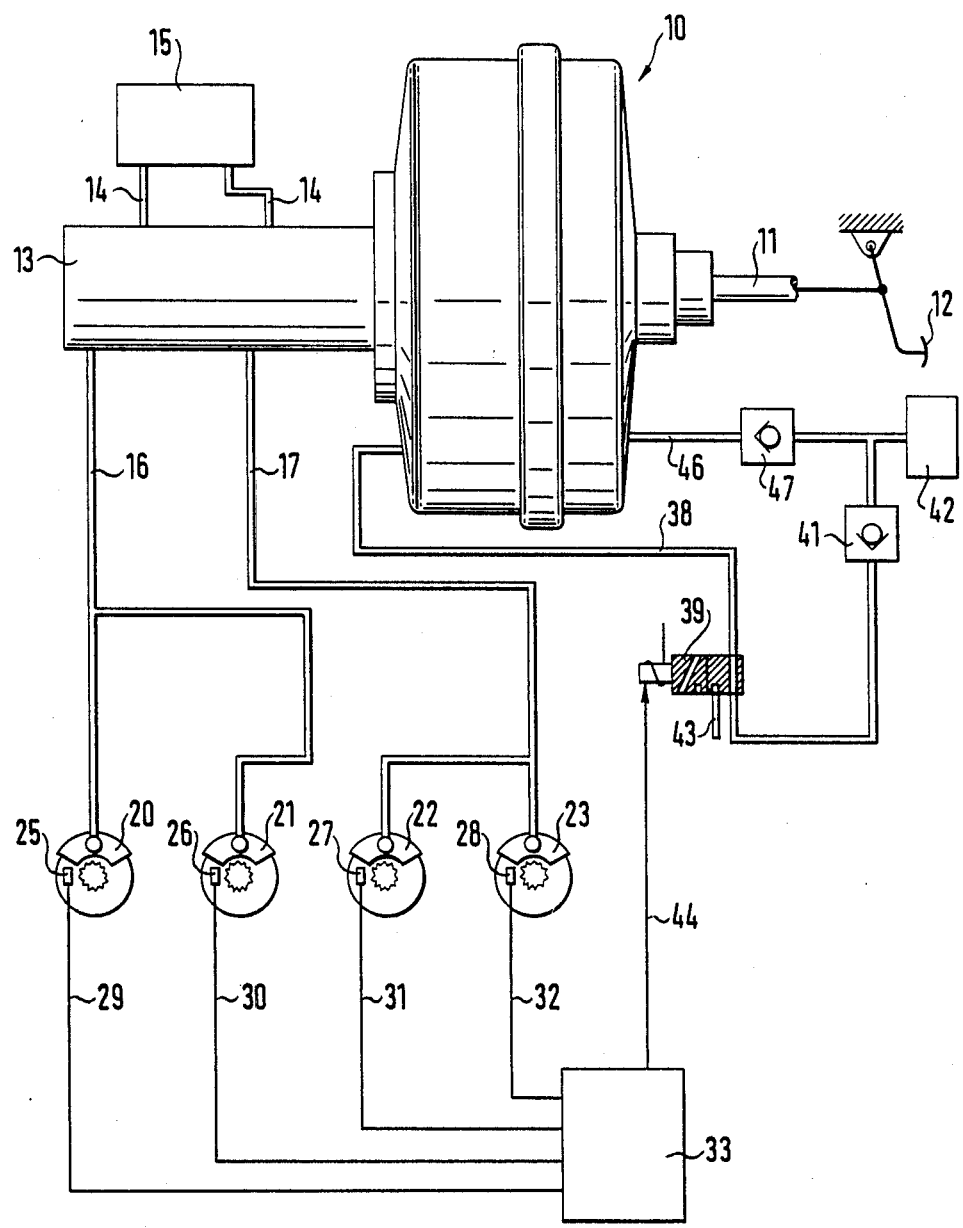

In another embodiment of the brake system for automotive vehicles, the wheel brake cylinder of the front and rear wheel brakes 20, 21 and 22, 23, respectively, are, as depicted in FIG. 1a, in communication with the tandem master brake cylinder 13 through brake conduits 16 and 17, respectively. Moreover, the vacuum accumulator 40 can be eliminated so that the first working chamber 37 of the vacuum brake force booster 10 is in communication with the vacuum source 42 through the vacuum conduit 38, the master magnetic valve 39 and a check valve 41.

Figure 2:
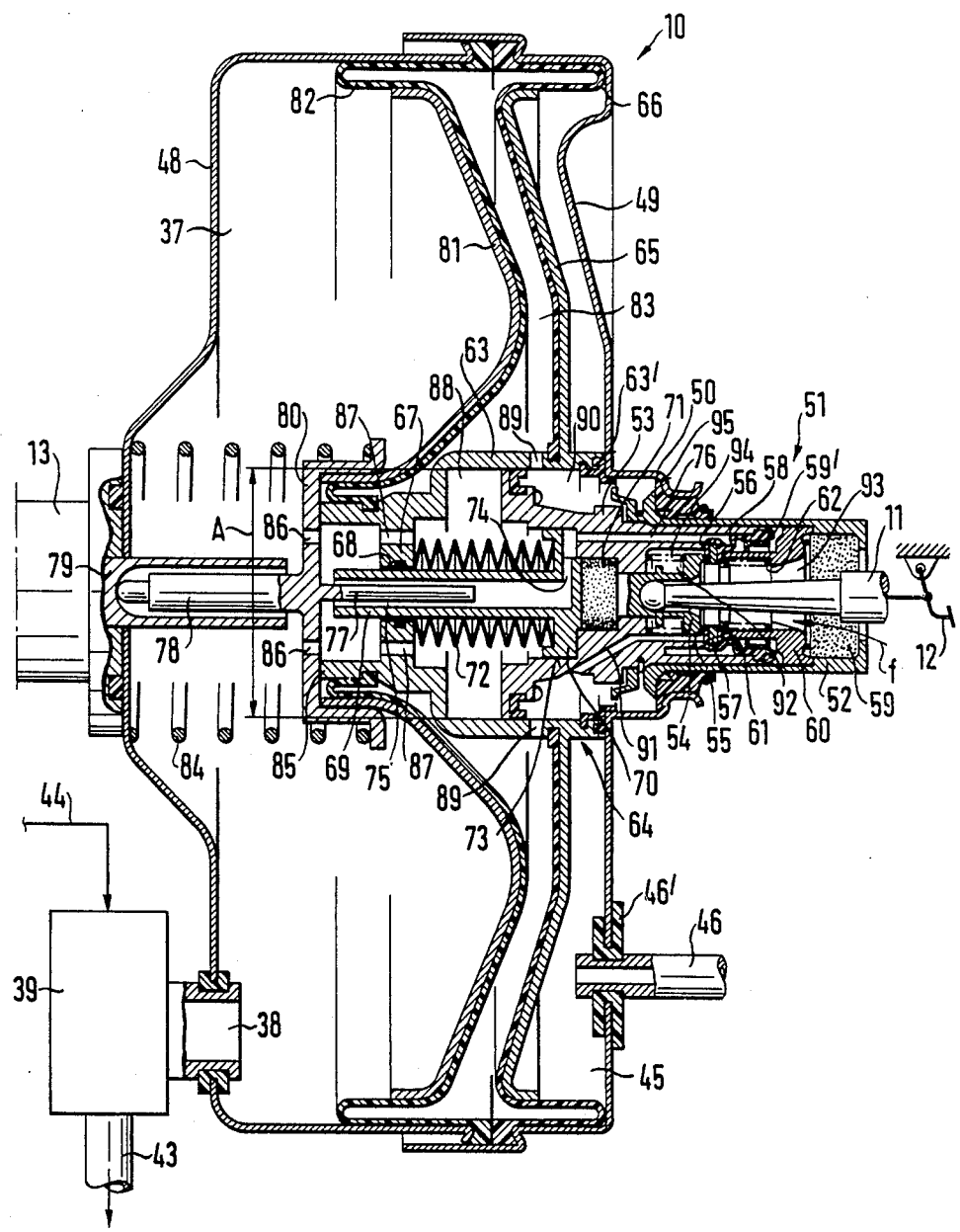
FIG. 2 is a sectional view of a one embodiment of a vacuum brake force booster showing details of construction.

As shown in FIG. 2, the vacuum brake force booster 10 includes two cup-shaped housing portions 48, 49 assembled together with the open sides thereof facing each other. Housing portion 48 which, in FIG. 2, is the lefthand portion, is rigidly connected to the tandem master brake cylinder 13 whereas the righthand housing portion 49 includes a central guide nozzle 50 holding the control unit 51 of the vacuum brake force booster 10 in a manner guided in sliding and vacuum-tight manner. The control unit 51 includes a rear control housing portion 52 extending from the vacuum brake force booster 10 toward the brake pedal 12, and a front control housing portion 53 disposed substantially within the brake force booster 10.

The piston rod 11, to which pressure is applied by the brake pedal 12, extends into the control unit 51 to apply, with the front end thereof, pressure to a valve piston 54 comprising a valve ring 55 pointing to the rear (to the right in FIG. 2). The valve ring 55 is surrounded by a ring sealing face 56 pointing to the rear and provided on the front control housing portion 53. Located axially opposite the ring sealing face 56 and the valve ring 55 is a valve plate 57 of ring-shaped configuration which extends, in the radial direction, across the valve ring 55 and the ring sealing face 56. A tubular sleeve 58 which is axially extensible in accordion-type manner seals the valve plate 57 against the rear control housing 52 and surrounds the piston rod 11 in spaced relationship. Provided between the piston rod 11 and the rear control housing portion 52 is an annular filter 59 through which atmospheric air can flow, in the direction of arrow f, into the interior of the control unit 51 provided that a vacuum prevails therein.

The tubular sleeve 58, through a control housing spring 59', is held in abutment with the rear sleeve-type section of the front control housing portion 53. The control housing spring 59' is supported on a stop ring 60 rigidly disposed on the rearward control housing portion 52. Formed on the front end of the stop ring 60 is a first stop 61 which limits the axial movement of the valve plate 57 to the rear which, through a plate valve spring 62 supported on the stop ring 60, is preloaded toward the valve ring 55 and the ring sealing face 56.

The front control housing portion 53 with the front end thereof, in piston-type manner, is guided within a guide sleeve 63 of an auxiliary membrane plate portion 64 in sliding and tight manner. The auxiliary membrane plate portion 64 disposed in the housing 48, 49 of the vacuum brake force booster 10 comprises an auxiliary membrane plate 65 rigidly connected to the guide sleeve 63 and extending therefrom radially outwardly. Provided on the outer side of the guide sleeve 63 are rolling bellows 66 in abutment with the front side of the auxiliary membrane plate 65 and extending toward the radially outer area of the rear housing portion 49 of the vacuum brake force booster 10 where it is also tightly located. The guide sleeve 63 has a rearward front face 63' thereof in abutment with the rear housing portion 49 thereby forming the second working chamber 45 between the rear housing portion 49 of the brake force booster 10 and the auxiliary membrane plate 65 and the rolling bellows 66, respectively.

The vacuum conduit 46 interconnects the second working chamber 45 and the vacuum source 42, is passed through a port in the housing portion 49 and is sealed by a sealing sleeve 46'.

The guide sleeve 63, in the area of its end facing away from the front control housing portion 53, comprises an inwardly extending support ring 67 provided with a central aperture 68 through which is guided a hollow pin 69 and which, at the end thereof associated with the control unit 51, includes a supporting flange 70 and through a resilient reaction member 71, is in abutment with the front control housing portion 53. The supporting flange 70, at the radial outer periphery thereof, is slidingly received in a cylindrical port 73 provided in the front control housing portion 53. Disposed between the support flange 70 and the support ring 67 of the guide sleeve 63 is a spring package 72 which, through the support flange 73, preloads the front control housing portion 53 toward the rear (to the right in FIG. 2) thereby preloading the ring sealing face 56 against the valve plate 57.

Also, the support flange 70 is provided with a radial port 74 interconnecting the axial cavity 75 of the hollow pin 69 and the connecting channel 76 provided in the control housing portion 53.

Located, with clearance, in the hollow pin 69 is a guide pin 77 integrally formed with a push rod 78 received in the hollow end of a pressure piston rod 79 of the tandem master brake cylinder 13 to transfer the brake force to the tandem master brake cylinder 13. A cup 80 holding a membrane plate 81 is fixed to the push rod 78, in the transitional area, between the guide pin 77 and the push rod 78. The membrane plate 81 is supported on the cup 80 within housing 48, 49 of vacuum brake force booster 10, and extends radially outwardly. Second rolling bellows 82 are provided on guide sleeve 63 and on the side of the membrane plate 81 facing the auxiliary membrane plate 65 and extend therealong radially outwardly toward the front housing portion 48 of the vacuum brake force booster 10, where it is tightly secured to seal the first working chamber 37 against a third working chamber 83.

Provided between the cup 80 and the front housing portion 48 of the vacuum brake force booster 10 is a return spring 84 acting on the cup 80 for retaining the membrane plate against a stop 85 provided on the guide sleeve 63, thereby rearwardly preloading the membrane plate 81.

The first working chamber 37 which, through the vacuum conduit 38 and the master magnetic valve 39, can be selectively connected to the vacuum source 42 or the atmosphere, through first axial bores 86 provided in the retaining cup 80 and through second axial bores 87 which are in communication with the interior chamber 88 of the guide sleeve 63.

The third working chamber 83 is in communication, through radial bores 89, with the rear inner chamber 90 of the guide sleeve 63. The rear inner chamber 90 is sealed from the front inner chamber 88 of the guide sleeve 63 by the front end of the front control housing portion 53 which is guided in piston-type manner within the guide sleeve 63. The chamber 90, through a passage channel 91, is in communication with a ring chamber 92 surrounding the valve piston 54, which ring chamber 92, through the poppet valve 55, 56, 57, is sealable against the connecting channel 76 and the cavity 93 surrounding the piston rod 11. Disposed in the annular chamber 92 is a valve piston return spring 94 which preloads the valve piston 54 against the valve poppet 57.

The function of the embodiment of the vacuum brake force booster 10 of FIG. 2 will hereinafter be described as follows:

With the brakes released, i.e., in the non-actuated condition of the vacuum brake force booster 10, the three working chambers 37, 45, 83 and the inner chambers 88 and 90 of the guide sleeve 63 are evacuated such that identical pressure conditions prevail therein. The return spring 84 forces the cup 80 against the stop 85 of the guide sleeve 63 thereby pushing the guide sleeve simultaneously with the rear front face 63' against the rear housing portion 49 of the vacuum brake force booster 10. The spring package 72 holds the hollow pin 69 in abutment with the front control housing portion 53. The control housing 53 is held through the annular sealing face 56, the valve poppet 57 and the stop ring 60 in abutment with the rear control housing portion 52 and at the same time is forced against a stop shoulder 95 on the guide nozzle 50. Simultaneously, the valve piston return spring 94 holds the valve ring 55 of the valve piston 54 in abutment with the valve poppet 57 such that the control valves 55, 56, 57 is closed.

If, during deceleration, the brake pedal 12 is applied, due to the force exerted, the piston rod 11 is shifted to the front to the left in FIG. 2, thereby carrying along the valve piston 54 such that the valve ring 55 lifts off the valve poppet 57 causing the control valves 55, 56, 57 to open the connection between the cavity 93 surrounding the piston rod 11 and the annular chamber 92 thereby enabling extend air under atmospheric pressure to flow through the passage channel 91 into the rear inner chamber 90 of the guide sleeve 63 and then through the ports 89 into the third working chamber 83. The pressure difference between the third working chamber 83 and the first working chamber 37 causes a displacement of the membrane plate 81 and hence, of the push rod 78 against the force of the return spring 84 causing force to be applied to the pressure piston rod 79 of the tandem master brake cylinder 13 whereby the pressure in the brake circuits 16, 17 required for applying the brakes, in known manner, is generated by the tandem master brake cylinder 13.

At the same time, the pressure difference between the second working chamber 45 and the third working chamber 83 causes the auxiliary membrane plate portion 64 to be held by the auxiliary membrane plate 65 with the front face 63' thereof in vacuum-tight manner in abutment with the rear housing portion 49. The force exerted on the auxiliary membrane plate 65 is in proportion to the pedal force and prevents mechanical transmission of the pedal force to the master cylinder.

As different pressures prevail in the inner chambers 88, 90 of the guide sleeve 63, a force is generated across the face A of the front of the front housing portion 53, which force, along with the brake pedal or pedal force which is transferred through the brake pedal 12, the piston rod 11 and the resilient reaction member 71 to the front control housing portion 53, displaces the control housing 53 forwardly such that the poppet valve spring 62 pushes the valve poppet 57 into abutment with the valve ring 55. Upon further increase in the pedal force, the valve piston 54 is again displaced so that external air may continue to flow into the third working chamber through the flow paths as described. The vacuum brake force booster 10, hence, is in its position of regulation, with the forces acting on the front control unit 53 being received by the spring package 72 which is supported on the auxiliary membrane plate portion 64.

The pressure difference between the first working chamber 37 and the third working chamber 83 is proportional to the force exerted on the piston rod 11 such that the force acting on the tandem master brake cylinder 13 is regulated in response to the pedal force acting on the brake pedal 12.

The front control housing portion 53 of the control unit 51 moves independently of the pressure difference prevailing across the membrane plate 81, which movement is caused by the pressure difference occurring on face A of the front control housing portion 53 and the pedal force exerted on the piston rod 11. The pressure difference acting across face A assures the regulating function of the vacuum brake force booster 10 since, due to the forward displacement of the annular sealing face 56, the valve poppet 57 can always be repositioned by the poppet valve spring 62 into abutment with the valve ring 55. Moreover, the transmission ratio can be adjusted through sizing of the face A and the characteristic of the spring package 72. The force generated by the pressure difference, through the face A influences the opening and closing of the control valve 55, 56, 57.

After termination of the braking process and the force exerted on the piston rod 11 is withdrawn, the valve piston return spring 94 will push the valve piston 54 with the valve ring 55 thereof against the poppet valve plate 57 to lift the plate against the force of the valve spring 62, from the ring sealing face 56, thereby opening the connection between the third working chamber 83 and the cavity 93 surrounding the piston rod 11, while, at the same time, the first working chamber 37, through the axial bores 86 provided in the cup 80, the cavity 75 in the hollow pin 69, the radial bore 74 and the connecting channel 76, is in communication with the annular chamber 92 surrounding the valve piston 54. The first working chamber 37 is also in communication, through the above-described connecting paths, with the third working chamber 83. Hence, the third working chamber 83, along with the first working chamber 37, through the vacuum conduit 38, can be evacuated until identical pressure conditions again prevail in the two working chambers 37, 83 and the control valve 55, 56, 57 is fully reclosed.

When a locking condition of a wheel is detected during a braking process by one or more sensors 25, 26, 27, 28 and is reported to the central electronic regulator 33, the regulator 33 will generate a switch-over signal which is transmitted through the control conduit 44 to the master magnetic valve 39. Responsive to the switch-over signal, the master magnetic valve 39 interrupts the communication between the first working chamber 37 and the vacuum source 42 and connects the first working chamber 37 instead directly to the external air connection. Hence, air under atmospheric pressure is allowed to flow into the first working chamber 37 thereby decreasing the pressure difference between the first and the third working chamber 37 and 83, respectively. This reduces the force generated by the membrane plate 81 such that the brake force generated by the tandem master brake cylinder 13 is equally decreased.

The pressure difference between the second working chamber 45 and the third working chamber 83 will not be affected thereby because on the other hand, the second working chamber 45, through the vacuum conduit 46, is in direct communication with the vacuum source 42 and, on the other hand, the pressure in the third working chamber 83 remains unchanged such that the control unit 51 will remain in the full or partial braking positions.

However, because the front inner chamber 88 of the guide sleeve 63, through the axial ports 87 and 86, is in communication with the first working chamber, the pressure will increase such that the pressure difference between the front and the rear inner chamber 88 and 90, respectively, of the guide sleeve 63 will decrease thereby reducing the force acting on the front control housing portion 53. The decrease in the force generated through the face A of the front control housing portion 53 causes a return signal or indication of the antilocking regulation function of the vacuum brake force booster 10 to the brake pedal 12 since the restoring force of the spring package 72 is no longer opposed to as a high degree as it is during a normal trouble-free braking operation. The indication being that the pedal force on the brake pedal 12 must be correspondingly increased to hold the pedal in the corresponding braked position.

Once the brake pressure generated by the tandem master brake cylinder 13 has been decreased to such an extent that the locked wheel is free again to rotate, the switch-over signal of the electronic regulator 33 is terminated and the master magnetic valve 39 reconnects the first working chamber 37 to the vacuum source 42.

The first working chamber 37 is then re-evacuated thereby causing, at this moment, the pressure difference proportional to the pedal force generated by the brake pedal 12 between the first working chamber 37 and the third working chamber 83 to adjust such that the force acting on the pressure piston rod 79 of the tandem master brake cylinder 13 and the correspondingly generated brake pressure are reincreased.

In the event that another locking condition of a wheel occurs, the master magnetic valve 39 will again be switched in the manner as described above. Reswitching of the vacuum connection of the working chamber 37 to the external air connection 43 through the master magnetic valve 39 can be performed very rapidly, thereby modulating the brake force.

In the event of a vacuum failure prior to or during a braking process as a result of a malfunction or for other reasons, the three working chambers 37, 45, 83 will be vented in like manner, and the pedal force transferred by the brake pedal 12 to the piston rod 11 is then mechanically transferred, through the resilient reaction member 71, the support flange 73, to the spring package 72 which transmits the force to the inner guide sleeve 63 and, through the stop 85 and the cup 80 to the push rod 78. The membrane plate 65 is carried along by the guide sleeve 63.

The mechanical transmission of the pedal force from the piston rod 11 to the push rod 78 in the event of a vacuum failure will insure satisfactory operation of the brake system.

Figure 3:
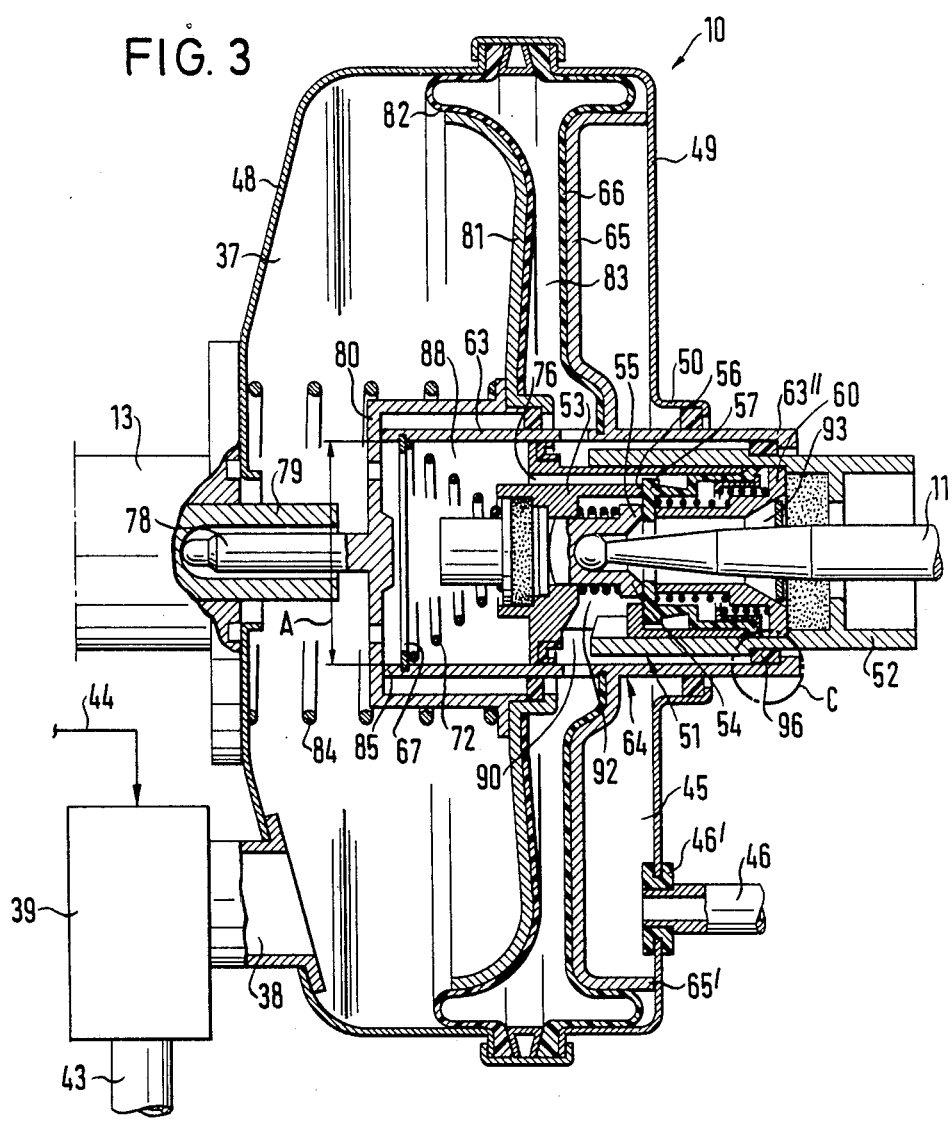
FIG. 3 is a sectional view of an alternative embodiment of a brake force booster showing details of construction.

FIG. 3 shows an alternative embodiment of a vacuum brake force booster 10 which comprises, as does the vacuum brake force booster 10 according to FIG. 2, a housing composed of two housing portions 48, 49, wherein a first, a second and a third working chamber 37, 45, 83 are provided. The working chambers 37, 45, 83 are separated from one another by membrane plates 81 and 65, and rolling bellows 82, 66.

As in the previously described vacuum brake force booster 10 according to FIG. 2, a piston rod 11 is also provided which acts on a valve piston 54 of a control valve 55, 56, 57 provided in a control unit 51 of a configuration corresponding to the one as described in FIG. 2. The booster includes a front control housing portion 53 and a rear control housing portion 52.

The front end of the front control housing portion 53 is slidingly and tightly diposed in piston-type manner within the guide sleeve 63 of the auxiliary membrane plate portion 64 and seals the front inner chamber 88 from the rear inner chamber 90 of the guide sleeve 63. The front inner chamber 88 is in communication with the first working chamber 37 while the rear inner chamber 90 is in communication with the third working chamber 83. The rear control housing portion 52 is located within a section 63" of the guide sleeve 63 extending through the guide nozzle 50. The rear control housing portion 52 is surrounded by a sealing ring 96 which with the outer periphery thereof is in abutment with the inner periphery of the rear section 63" of the guide sleeve 63 and seals the rear inner chamber 90 of the guide sleeve 63 from the atmosphere.

Figure 4:
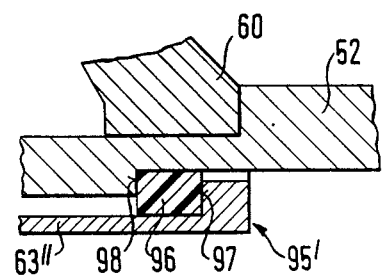
FIG. 4 is an enlarged sectional view of a portion of the brake force booster according to FIG. 3.

As shown in FIG. 4, the detail of the vacuum brake force booster 10 as marked by circle C is shown in enlarged scale. Formed on the rear section 63" of the guide sleeve 63 is a stop shoulder 97 on which the sealing ring 96 can be placed into abutment with the rear face thereof. The rear control housing portion 52 comprises a stop shoulder 98 extending radially outwardly and is capable of engaging the front face of the sealing ring 96. Due to the stop shoulders 97 and 98 and the sealing ring 96 disposed therebetween, a stop 95' is formed which limits rearward displacement of the control unit 51.

The auxiliary membrane plate portion 64 which, with the sleeve-type rear section 63" thereof is slidingly and tightly guided through the guide nozzle 50 of the rear housing portion 49. Provided on the radial outer periphery of the auxiliary membrane plate 65 is a rearwardly extending stop ring 65' which, upon displacement of the auxiliary membrane plate portion 64 to the rear, engages with the rear housing portion 49 of the vacuum brake force booster 10 thereby limiting the rearward displacement of the auxiliary membrane plate portion 64.

The operation of the vacuum brake force booster 10 according to FIG. 3 will be hereinafter described as follows:

In the deactivated condition, the three working chambers 37, 45, 83 are evacuated such that no pressure differences exist that would be capable to exert a force on the membrane plates 81, 65 or the front control housing portion. The cup 80 retaining the membrane plate, through the return spring 84, is forced to the rear or, as shown in FIG. 3, to the right, until the cup 80 is in abutment with the stop 85 provided on the guide sleeve 63 of the auxiliary membrane plate portion 64, thereby forcing the auxiliary membrane plate portion 64 to the rear so that the stop ring 65', on the auxiliary membrane plate 65, contacts the rear housing portion 49 of the vacuum brake force booster 10, thereby stopping a further displacement. The front control housing portion 53 is displaced to the rear by the spring package 72 until the rear housing portion 52 abuts the stop 95' to preclude further rearward movement thereof.

When during deceleration, the pedal force, through the piston rod 11, is transferred to the valve piston 54, the valve ring 55 is lifted off the valve poppet 57, and the third working chamber 83 is vented as described in greater detail with reference to FIG. 2, thereby causing a pressure difference between the first working chamber 37 and the third working chamber 83, generating a force acting on the membrane plate 82 which is transferred, in the afore-described manner, as a brake pressure to the pressure piston rod 79 of the tandem master brake cylinder 13. At the same time, a pressure difference occurs between the front inner chamber 88 of the guide sleeve 63 and the rear inner chamber 90 thereof which generates a force displacing the front control housing 53 to the front such that the control valve 55, 56, 57 can again close.

Ventilation of the third working chamber 83 causes a pressure difference between the third and the second working chambers 83, 45, thereby holding the auxiliary membrane 64 in its rear portion.

When the electronic regulator 33, detects a locking condition of one or several wheels, it supplies a switch-over signal to the master magnetic valve 39, and the vacuum connection as established with the first working chamber 37 is interrupted, and simultaneously placed in communication with the atmosphere. This will reduce the pressure difference between the first and the third working chamber 37 and 83, respectively, causing, at the same time, a reduction in the brake pressure generated by the tandem master brake cylinder 13. Once the locked wheel (wheels) is free to rotate, the first working chamber 37, through the vacuum conduit 38, is reconnected to the vacuum source 42, and the pressure difference generating the brake force, between the first working chamber 37 and the third working chamber 83, is reincreased.

Upon termination of the braking process, the valve piston 54 is forced back into its rest position, the valve poppet 57 lifts from the annular sealing face 56 thereby establishing the connection between the third and first working chambers 83 and 37, respectively such that the third working chamber can be re-evacuated and the pressure difference for generating the brake force for acting upon the membrane plate 81 is terminated and the control unit 51 and the membrane plate 81 along with the membrane plate retaining cup 80, are pushed back into their initial position.

In the vacuum brake force booster 10 according to FIG. 3, as in the one according to FIG. 2, the front inner chamber 88 of the guide sleeve 63 may be connected to the second working chamber 45 in permanent communication with the vacuum source 42 rather than to the first working chamber 37, the consequence of which will be that, in the event of a brake skid control, the pressure difference between the front inner chamber 88 and the rear inner chamber 90 of the guide sleeve 63 is maintained unchanged thereby eliminating a return signal indicative of the presence of a brake skid control operation. In that case, no change in the force is noted on the brake pedal 12 during the brake skid control operation.

The evacuation of the vented working chamber 83 upon termination of the braking process is effected through the rear inner chamber 90 of the guide sleeve 63, the annular chamber 92, the poppet valve 55, 56, 57 when open between annular sealing face 56 and valve poppet 57, the front inner chamber 88 of the guide sleeve 63 and the second working chamber 45.

Now, the antilocking control of the brake system for automotive vehicles according to FIG. 1 will be described:

As described in the afore-going, the force generated by the brake pedal 12, during deceleration, is boosted by the vacuum brake force booster 10 and is transferred to the tandem master brake cylinder 13 generating the required brake pressure and transferring the same, through the brake circuits 16, 17, to the wheel brake cylinders of the front wheel and rear wheel brakes 20, 21 and 22, 23, respectively. Once a locking condition of the corresponding wheel is detected by one of the sensors, e.g., sensor 25 associated with the front wheel brake 20, the central electronic regulator will generate a switch-over signal for the master magnetic valve 39, as well as switch-over signals applying force, through the control conduits 35, 36, to those magnetic valves 19, 24 that are associated to the non-locking wheels. The magnetic valves 19, 24 interrupt the brake fluid conduits of the brake circuits 16, 17 leading to the brakes 21, 22, 23 associated with the rotating wheels such that the hydraulic pressure is maintained in the corresponding wheel brake cylinders. By switching the master magnetic valve 39, the force applied to the tandem master brake cylinder 13 is reduced and the hydraulic pressure generated by the tandem master brake cylinder 13 is correspondingly decreased. The pressure decrease will result in releasing the front wheel brake 20 of the locking front wheel, as the corresponding magnetic valve 18 has not been closed. Once the master magnetic valve 39 and the remaining magnetic valves 19, 24 are reopened, the front wheel and the real wheel brakes 20, 21, 22, 23 are reapplied in usual manner.

In the simplified brake system for automotive vehicles according to FIG. 1a, upon detection of the locking condition of a wheel, the master magnetic valve 39 is reswitched in like manner which will result in a pressure decrease on the tandem master brake cylinder 13. However, as no magnetic valves are provided in the brake circuits 16, 17, all brakes 20, 21, 22, 23 are released until the locking wheel is again free to rotate and the master magnetic valve 39 reconnects the first working chamber 37 of the vacuum brake force booster 10 to the vacuum source 42 to enable the braking process to be continued in usual manner.

Figure 5:
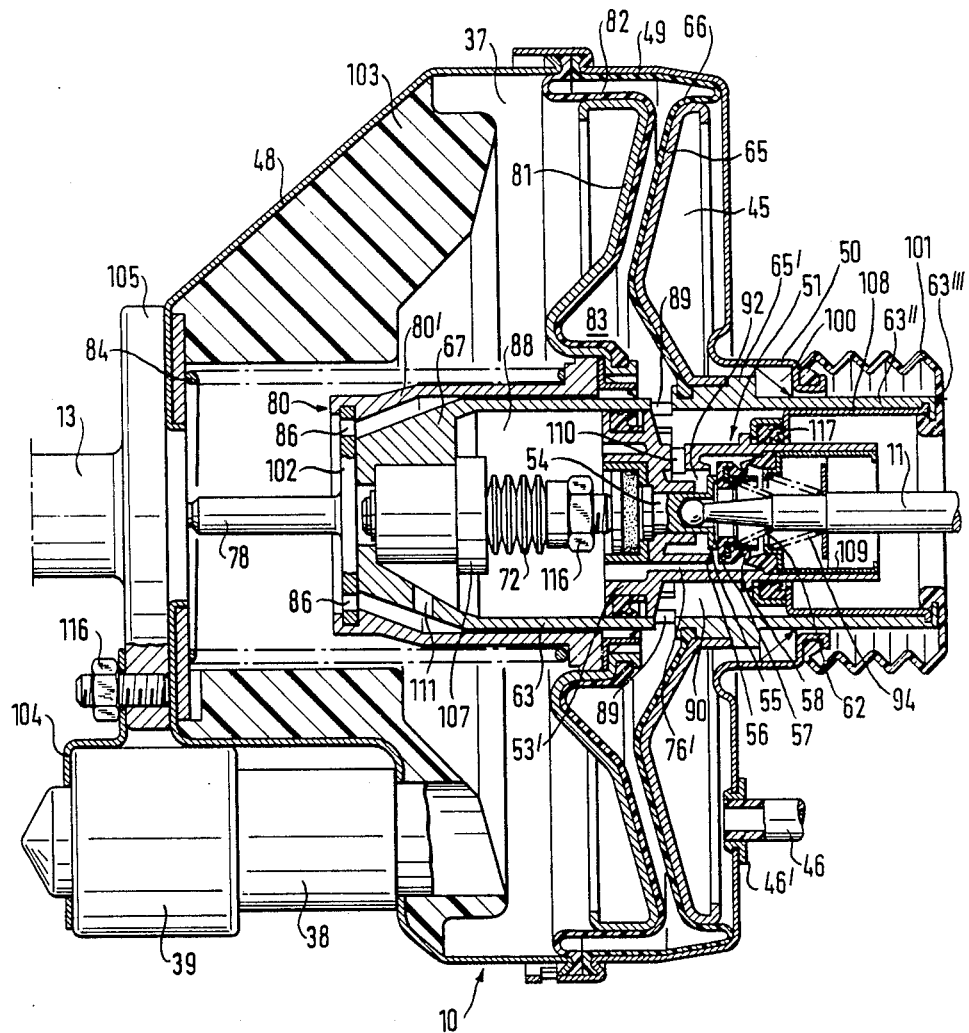
FIG. 5 is a sectional view of another alternative embodiment of a brake force booster.

FIG. 5 shows another embodiment of a vacuum brake force booster 10 comprising a housing composed of two housing portions 48, 49 wherein are provided a first, a second, and a third working chamber 37, 45 and 83, respectively. The working chambers 37, 45, 83 are separated from one another by membrane plates 81 and 65, respectively, provided with rolling bellows 82, 66.

The auxiliary membrane plate 65 confines the second working chamber 45 in permanent communication with the vacuum source 42 through a vacuum conduit 46, and is fixed to a guide sleeve 63 which, with the rear section 63" thereof, by means of a sealing ring 100, is slidingly and tightly guided within a guide nozzle 50 of the rear housing portion 49 of the vacuum brake force booster 10. Provided on the guide sleeve 63 is a stop ring 65' in communication with the auxiliary membrane plate 65 to limit the rearward movement of the guide sleeve 63 and of the auxiliary membrane plate 65 once it is forced against the sealing ring 100.

To preclude the ingress of dirt and other contaminations in the area between the guide nozzle 50 and the guide sleeve 63, a bellows 101 is provided which, with the one end thereof, is located on the guide nozzle 50 and with the other end thereof is located on the rear front face 63'" of the guide sleeve 63.

The membrane plate 81 is slidingly and tightly disposed on the guide sleeve 63 and is held by a membrane plate retaining cup 80 formed as a holding sleeve 80' surrounding the guide sleeve 63, and a cup bottom 102. Secured to the cup bottom 102 is a push rod 78 which transmits the brake force generated by the brake force booster 10, to the tandem master brake cylinder 13.

Provided between the front housing portion 48 of the brake force booster 10 and the membrane plate retaining cup 80 is a return spring 84 for preloading the membrane plate retaining cup 80 and, hence, the membrane plate 81 in the rearward direction.

Disposed in the first working chamber 37 which, through the vacuum line 38 and the master magnetic valve 39 may selectively be connected to the vacuum source 42 or the atmosphere, is an annular stabilizer unit 103 in abutment with the front housing unit 48 to form a stop limiting the forward movement of the auxiliary membrane plate 81.

The master magnetic valve 39, in this embodiment, is held by a bracket 104 on the mounting flange 105 of the tandem master brake cylinder 13 to which the vacuum brake force booster 10 is flanged, with the bracket 104 being held to the mounting flange 105 by means of a nut 106.

Disposed in the guide sleeve 63 is a control unit 51 comprising a housing portion 53' disposed within the guide sleeve 63 in piston-type manner. The housing portion 53', through a first push member 106 which is adjustable in length, a spring package 72 and a second push member 107, is supported against a support ring 67 provided on the front end of the guide sleeve 63.

Housing portion 53' separates a front inner chamber 88 of the guide sleeve 63 from a rear inner chamber 90, with the rear inner chamber 90, to the rear, being sealed from the atmosphere by a reinforced sealing ring 107. The sealing ring, through a stop sleeve 108, is supported on the rear section 63" of the guide sleeve 63 to form a stop for the housing portion 53' to limit the movement thereof to the rear.

Disposed in the interior of the housing portion 53 is a poppet valve 55, 56, 57. Force is applied to the valve piston 54 by piston rod 11. Provided on the valve piston 54 is a valve ring 55 against which is forced a valve poppet 57 by a poppet valve spring 62 which is supported on the piston rod 11. Also, a valve piston return spring 94 is provided which has one end thereof supported on the piston rod 11 and has the other end thereof, through a support sleeve 109 supported on the housing portion 53' such that the valve ring 55 is held in sealing engagement with the valve poppet 57 as long as no pedal force is applied to the piston rod 11 through the brake pedal 12.

Provided spaced from the valve piston 14 on the housing portion 53' is an annular sealing face 56 also cooperating with the valve poppet 57. Located between the valve poppet 57 and the housing portion 53' is a sealing sleeve 58 which seals a connecting chamber 76' in the housing portion 53' from the atmosphere.

An annular chamber 92 surrounding the valve piston 54, sealed from the connecting chamber 76' when the valve poppet 57 is in abutment with the annular sealing face 56. The annular chamber 92, through a radial passage in the guide sleeve 63 which, in turn, through radial bores 89, is in communication with the ventable working chamber 83 of the brake force booster 10.

The connecting chamber 76' leads to the front inner chamber 88 of the guide sleeve 63 which, in turn, through a passage opening 111 provided in the guide sleeve 63, and axial ports 86 provided in the cup bottom 102, is in communication with the first working chamber 37.

The operation of the vacuum brake force booster 10, according to FIG. 5 will now be described as follows:

In the non-activated condition of the brake system all three working chambers 37, 45, 83 of the brake force booster 10 have the same vacuum. Hence, the membrane plate retaining cup 80 is forced by the return spring 84 against the front end of the guide sleeve 63 which together with the auxiliary membrane plate 65 is thus held in its rearmost position fixed by the stop ring 65' and the sealing ring 100. At the same time, the housing portion 53' of the control unit 51 through the spring package 72, is held in its rearward position limited by the reinforced sealing ring 107. Also, the valve ring 55 of the valve piston 54 is held in engagement with the valve poppet 57.

When a pedal force, during initiating a braking process, is transferred from the brake pedal 12 to the piston rod 11, the valve piston 54 is displaced forwardly, to the left, in the drawing, with the valve poppet 57 follows until it abuts with the ring sealing face 56. At that moment, the poppet valve 55, 56, 57 closes the connection between the connecting chamber 76' and the ring chamber 92. Continued displacement of the valve piston 54 through the piston rod 11 causes the valve ring 55 to be lifted from the valve poppet 57 thereby connecting the annular chamber 92 to the atmosphere. Now, air under atmospheric pressure, through the correspondingly opened poppet valve 55, 56, 57, the annular chamber 92 and the ports 110, can flow into the rear inner chamber 90 of the guide sleeve 63, wherefrom it flows through the radial ports 89 into the vented working chamber 83.

Brake force boosting is effected in the same manner as described in connection with the vacuum brake force boosters according to FIGS. 2 and 3. The guide sleeve 63 is held as it is with the other vacuum brake force boosters 10 as described, in its rearward position by the pressure difference prevailing on the auxiliary membrane plate 65.

When the locking condition of one or more wheels is detected by one or more of the sensors 25, 26, 27, 28, the electronic regulator 33 supplies a switch-over signal to the master magnetic valve 39, and the first vacuum working chamber 37 is placed in communication with the atmosphere. The antilocking control is also effected in the manner as described in connection with the other embodiments.

When the braking process is terminated and no brake pedal force is any longer exerted on the piston rod 11, the piston rod 11 and, hence, the valve piston 54 is again displaced to the rear such that the valve ring 55 will come into engagement with the valve poppet 57 to lift the poppet from the annular sealing face 56. The poppet valve 55, 56, 57 will thereby release the connection between the annular chamber 92 and the connecting chamber 67' while the communication with the atmosphere, at the same time, will be interrupted. Thereafter, the vented working chamber 83, through the radial ports 89, the rear inner chamber 90 of the guide sleeve 63, the radial port 110, the annular chamber 92, the connecting chamber 76 and the front inner chamber of the guide sleeve 63 which communicates through the vacuum working chamber 37 with the vacuum source 42, can be evacuated until the same vacuum again prevails in all three working chambers 37, 45, 83. Thereupon, the individual units will be displaced by the return spring 84 and the spring package 72, respectively, back into their initial positions. The brake system is then ready for a another braking process.

In the event of a failure of the vacuum source 42, the brake pedal force, through the piston rod 11, and the valve piston 54, is transmitted directly to the housing portion 53' which transfers the brake pedal force, through the first push member 106, the spring package 72 and the second push member 107, to the guide sleeve 63 in abutment with the cup bottom 102 thereby transferring the brake pedal force directly to the push rod 78 and to the tandem master cylinder 13. This will insure in the event of malfunction of the brake system that the brake pedal force, although unboosted, is transferred to the master tandem brake cylinder 13 to enable the automotive vehicle to be decelerated.

What is claimed is:

1. In a brake system for automotive vehicles, comprising a vacuum brake force booster operatively disposed between a brake pedal and a master brake cylinder, said booster including at least two working chambers separated from one another by a first membrane plate, one of said working chambers being located at the front of said booster and, through a master magnetic valve, being in communication with a vacuum source, the other of said working chambers being ventable through a control valve actuable by the brake pedal to generate a brake force proportional to a force on the brake pedal, brake circuits for applying pressure to wheel brake cylinders, said circuits being in communication with the master brake cylinder, sensors operatively associated with each wheel of the vehicle to be decelerated by said system for detecting the rotational behavior of the wheels to identify a brake locking condition, said sensors generate output signals, said output signals applied as input signals to a central electronic regulator, said electronic regulator generating, in response to the input signals, at least one switch-over signal, said switch-over signal applied to the master magnetic valve, said valve adapted to switch-over so that the working chamber connected to the vacuum source is connected with atmosphere and disconnected from the vacuum source; the improvement comprising an auxiliary membrane plate fixed to a guide sleeve, a guide nozzle at the rear of said housing slidably receiving said guide sleeve, a rearwardly facing stop ring mounted on said auxiliary membrane plate engageable with a sealing ring on said rear housing portion, said auxiliary membrane plate being disposed between said other working chamber and an additional working chamber which is in permanent communication with the vacuum source, a piston rod for receiving the brake pedal force, said piston rod supported on the guide sleeve by a spring package, said first membrane plate being movable in said booster in a manner freely displaceable away from the guide sleeve.

2. The brake system for automotive vehicles according to claim 1 wherein the guide sleeve includes a front face facing away from the membrane plate, said guide sleeve being forceable against a rear housing portion of the vacuum brake force booster.

3. The brake system for automotive vehicles according to claim 1 wherein a front face of the guide sleeve forms a stop engageable with said one membrane plate.

4. The brake system for automotive vehicles according to claim 3 wherein said one membrane plate is held on a membrane plate retaining cup, said retaining cup receivable against the stop provided on the front face of said guide sleeve.

5. The brake system for automotive vehicles according to claim 4 wherein the membrane plate retaining cup is formed integrally with a master cylinder push rod for transmitting the brake force to the master brake cylinder.

6. The brake system for automotive vehicles according to claim 1 wherein the spring package has a force characteristic for creating a feedback signal through the brake pedal.

7. The brake system for automotive vehicles according to claim 1 further comprising a control unit including the control valve slidingly disposed in the guide sleeve, a control unit pressure applied by the piston rod to said control unit, said control unit forced by the spring package against a support ring provided in an area of a front end of the guide sleeve.

8. The brake system for automotive vehicles according to claim 7 wherein the spring package forces the control unit, in a rest position, against a rear stop shoulder.

9. The brake system for automotive vehicles according to claim 8 wherein the stop shoulder is formed on a guide nozzle of a rear housing portion of the booster.

10. The brake system for automotive vehicles according to claim 8 wherein the stop shoulder is formed on the guide sleeve.

11. The brake system for automotive vehicles according to claim 10 wherein the stop shoulder formed on the guide sleeve is disposed on a rear end thereof.

12. The brake system for automotive vehicles according to claim 7 wherein the control unit, includes a front control housing portion guided in piston-type manner within the guide sleeve, and subdividing an inner chamber of the guide sleeve into a front and a rear inner chamber the rear inner chamber being in communication with the ventable working chamber of the vacuum brake force booster, and means for connecting the front chamber to the vacuum source.

13. The brake system for automotive vehicles according to claim 12 wherein the front inner chamber of the guide sleeve is connected to the vacuum source through the first working chamber.

14. The brake system for automotive vehicles according to claim 12 wherein the front inner chamber of the guide sleeve is in communication with the vacuum source through the second working chamber.

* * * * *